United States Patent [19]

Rosen et al.

[11] Patent Number: 4,858,229
[45] Date of Patent: Aug. 15, 1989

[54] FILTER INTERCONNECTION MATRIX

[75] Inventors: Harold A. Rosen, Santa Monica; James D. Thompson, Manhattan Beach, both of Calif.

[73] Assignee: Hughes Aircraft Company, Los Angeles, Calif.

[21] Appl. No.: 896,559

[22] Filed: Aug. 14, 1986

[51] Int. Cl.$^4$ .................... H04Q 11/02; H04J 1/10; H04B 7/185
[52] U.S. Cl. ...................................... 370/75; 370/123
[58] Field of Search .................... 455/12, 33; 370/104, 370/75, 123, 57

[56] References Cited

U.S. PATENT DOCUMENTS

| | | | |
|---|---|---|---|
| 4,144,495 | 3/1979 | Metzger | 455/12 |
| 4,228,401 | 10/1980 | Wachs et al. | |
| 4,706,239 | 11/1987 | Ito et al. | 370/75 |
| 4,730,310 | 3/1988 | Acampora et al. | 455/33 |

FOREIGN PATENT DOCUMENTS

2184921 7/1987 United Kingdom.

OTHER PUBLICATIONS

Patent Abstracts of Japan, vol. 8, No. 256 (E-280) (1693), Nov. 22, 1984, see entire document.
S. N. Verma et al., "Westar Satellite System Expansion," Int'l. Conference on Communications, Denver Colorado, Jun. 14–18, IEEE (New York), vol. 3 of 4, pp. 58.4.1–58.4.5.
G. Berk et al., "Comparative Study of FDMA, TDMA and Hybrid 30/20 GHz Satellite Communications System for Small Users," International Conference on Communications, Conference Record, Philadelphia, Jun. 13–17, 1982, IEEE (New York), pp. 5E.2.2–5E.2.6.

*Primary Examiner*—Douglas W. Olms
*Assistant Examiner*—Melvin Marcelo
*Attorney, Agent, or Firm*—Mark J. Meltzer; A. W. Karambelas

[57] ABSTRACT

A satellite communications system employs separate subsystems for providing broadcast and point-to-point two-way communications using the same assigned frequency band. The broadcast and point-to-point subsystems employ an integrated satellite antenna system which uses a common reflector (12). The point-to-point subsystem achieves increased communication capacity through the reuse of the assigned frequency band over multiple, contiguous zones (32, 34, 36, 38) covering the area of the earth to be serviced. Small aperture terminals in the zones are serviced by a plurality of high gain downlink fan beams (29) steered in the east-west direction by frequency address. A special beam-forming network (98) provides in conjunction with an array antenna (20) the multiple zone frequency address function. The satellite (10) employs a filter interconnection matrix (90) for connecting earth terminals in different zones in a manner which permits multiple reuse of the entire band of assigned frequencies. A single pool of solid state transmitters allows rain disadvantaged users to be assigned higher than normal power at minimum cost. The intermodulation products of the transmitters are geographically dispersed.

21 Claims, 10 Drawing Sheets

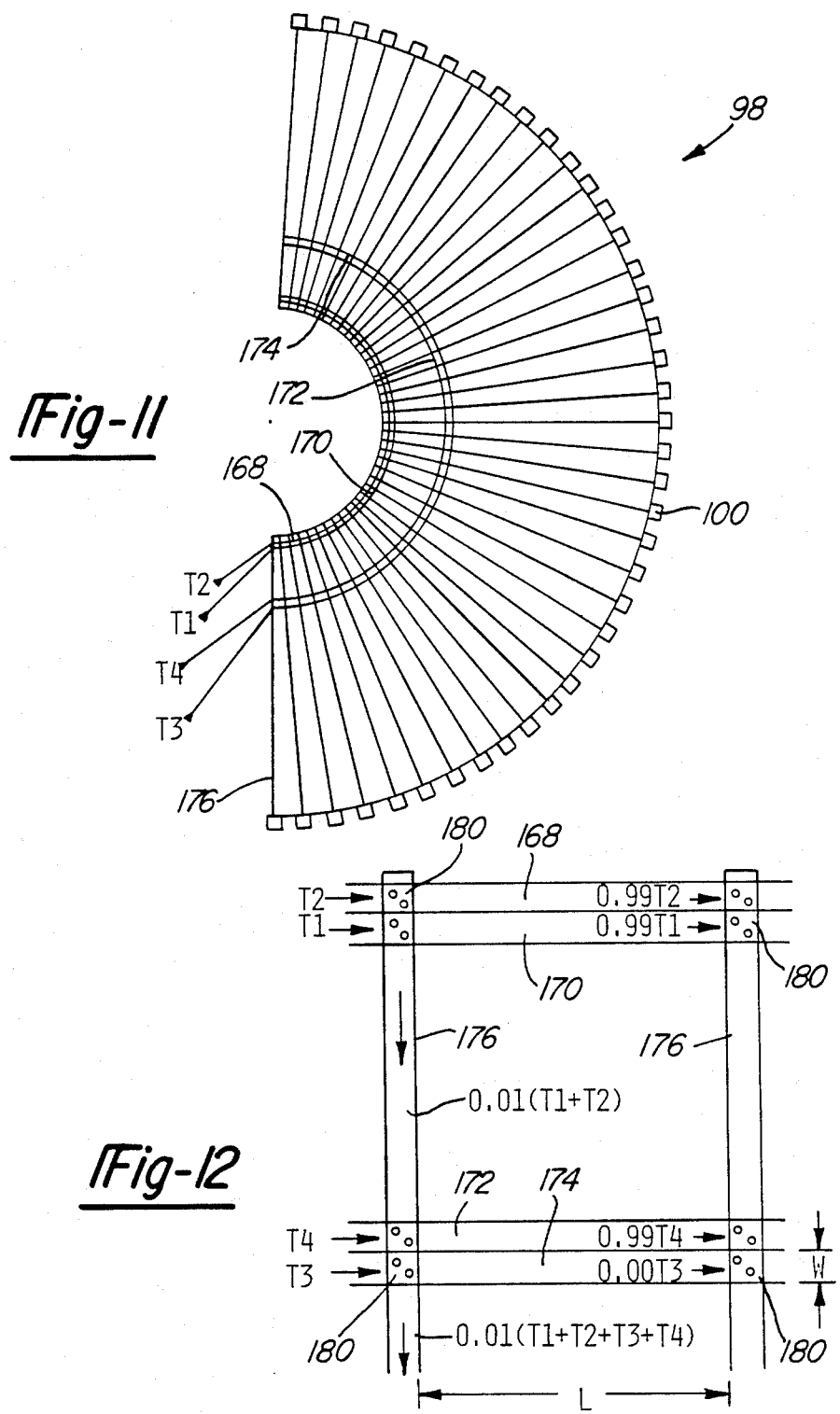

FILTER INTERCONNECTION MATRIX

TECHNICAL FIELD

The present invention broadly relates to devices for distributing and routing signals in communications systems, and especially those employing a geosynchronous communication satellite which acts as a two-way communications link between earth terminals. More particularly, the invention deals with a filter interconnection matrix for use in a communications satellite for interconnecting terminals in one zone serviced by the satellite with terminals in another zone where the frequency spectrum for the uplink and downlink are the same for each zone.

BACKGROUND ART

In connection with microwave communication systems, such as those used in communication satellites, microwave channelizing filters are provided to separate the receive antenna beam signals according to frequency. In previous systems, polarization and spatial isolation of beams were employed to permit reuse of the assigned frequency spectrum. The systems were often designed with two sets of channelizing filters, where all of the receive antenna beam signals of given polarization are filtered by a set of filters corresponding to that polarization. To improve the isolation between adjacent filters within a filter set, the filters were separated into two groups, whereby one group contained all odd-numbered filters and the other group contained all even-numbered filters. However, as the number of isolated beams is increased, the interconnection of all the users becomes very complicated and is one of the factors that limits the number of reuses of the frequency spectrum.

The above-discussed filtering arrangement is unsuitable for new generations of communication satellites wherein it is desirable to reuse the assigned uplink and downlink frequency spectrums over a plurality of geographic zones and to interconnect small earth terminals in one zone with terminals in another zone. An example of such a communications satellite is disclosed in U.S. patent application Ser. No. filed as 896,983, owned by the Assignee of the present application. In the system disclosed in that application, a communication satellite interconnects large numbers of very small aperture earth terminals in a manner which maximizes satellite EIRP as well as the available bandwidth. The system employs highly directional contiguous beams on the downlink which substantially increases the EIRP and allows multiple reuse of the assigned frequency spectrum. As a result, the number of communications that can be provided for point-to-point service is maximized. The high multicarrier transmitter efficiency is achieved as a result of the dispersion of intermodulation products and the deleterious effects of rain on the downlink channels are easily overcome by the use of pooled transmitter power. The interconnection of the many users is achieved by a combination of a filter interconnection matrix and a highly directional addressable downlink beam.

The present filter interconnection matrix is intended to overcome the deficiencies of the prior art and may be employed with a satellite communication system of the type discussed above.

SUMMARY OF THE INVENTION

In accordance with the present invention, a device is provided for connecting a set of communication input lines with a set of communication output lines wherein the input lines each carry a frequency division multiplexed signal having a plurality of channels. The device includes interconnection means having a plurality of inputs respectively connected with the input lines for receiving the corresponding ones of the signals and having a plurality of outputs respectively connected with the set of output lines for outputting to each of the lines the signals on certain preselected channels of each of the signals received on the inputs. The interconnection means includes a filter interconnection matrix comprising a plurality of sets of filters each of which is designed to pass one of the channels of the incoming signal. Each set of filters is arranged into a plurality of groups thereof with each group of filters being connected with one of the output lines such that only certain channels of the incoming signals are delivered to each of the output lines through a corresponding group of filters. The filters are interconnected between the input and output lines in a matrix arrangement such that the channels output by each output line are derived from each of the input lines.

The device is particularly useful in a satellite communications system of the type including an earth orbit satellite communicatively linking a plurality of earth terminals on an area of the earth for two-way communication. The satellite receives a plurality of uplink beams respectively from different zones covering the area. Each uplink beam carries a plurality of respectively corresponding frequency division multiplexed transmit signals over the same range of frequencies, with each of the receive signals including a plurality of channels. The satellite transmits respectively to the zones a plurality of downlink beams carrying a plurality of respectively corresponding transmit signals over the same range of frequencies. The device of the present invention may be employed in such a system for interconnecting the uplink and downlink beams at the satellite such that the receive signals are transformed into the transmit signals.

Accordingly, it is a primary object of the present invention to provide a filter interconnection matrix for use in interconnection first and second sets of communication lines.

Another object of the invention is to provide a filter interconnection matrix of the type described above which is particularly useful for satellite communication systems for interconnecting uplink and downlink beams.

Another object of the invention is to provide a filter interconnection matrix of the type described above for transforming the receive signals of the uplink beam into transmit signals forming the downlink beam, wherein the transmit and receive signals respectively cover different zones on the earth serviced by the satellite.

These, and further objects and advantages of the invention will be made clear or will become apparent during the course of the following description of a preferred embodiment of the present invention.

BRIEF DESCRIPTION OF THE DRAWINGS

In the accompanying drawings:

FIG. 11 is a detailed, plan view of the beam-forming network employed in the point-to-point system;

FIG. 12 is an enlarged, fragmentary view of a portion of the beam-forming network shown in FIG. 11;

DESCRIPTION OF THE PREFERRED EMBODIMENTS

Figure 1:
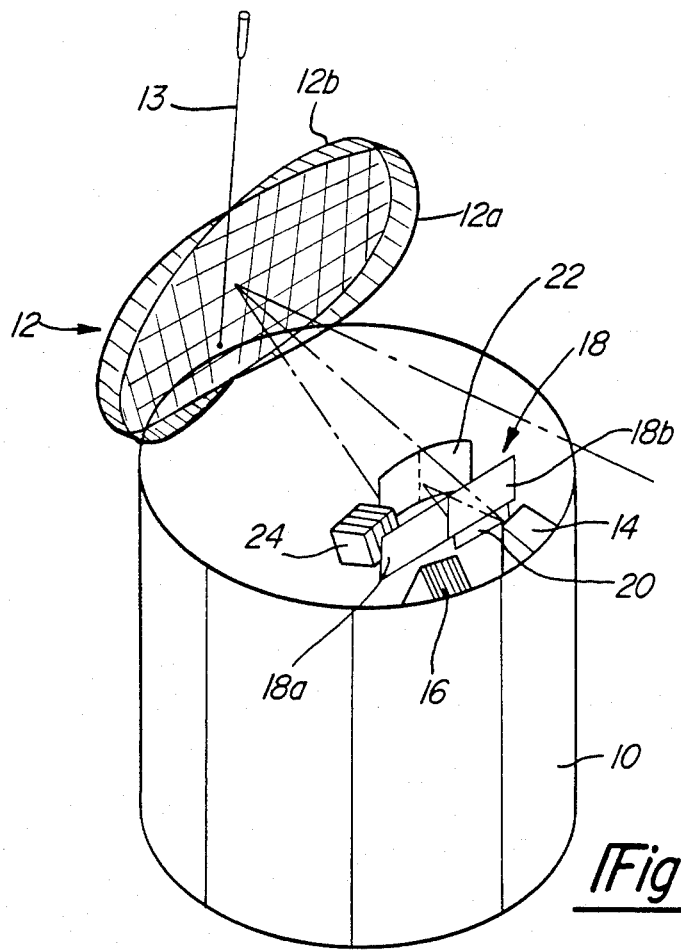
FIG. 1 is a perspective view of a communications satellite, showing the antenna subsystems.

Referring first to FIGS. 1-4, a communications satellite 10 is depicted which is placed in geosynchronous orbit above the earth's surface. The satellite's antenna system, which will be described in more detail below, will typically be mounted on an earth-oriented platform so that the antenna system maintains a constant orientation with respect to the earth.

The satellite 10 is of a hybrid communications-type satellite which provides two different types of communication services in a particular frequency band, for example, the fixed satellite service Ku band. One type of communication service, referred to hereinafter as point-to-point service, provides two-way communications between very small aperture antenna terminals of relatively narrow band voice and data signals. Through the use of frequency division multiple access (FDMA) and reuse of the assigned frequency spectrum, tens of thousands of such communication channels are accommodated simultaneously on a single linear polarization. The other type of communication service provided by the satellite 10 is a broadcast service, and it is carried on the other linear polarization. The broadcast service is primarily used for one-way distribution of video and data throughout the geographic territory served by the satellite 10. As such, the transmit antenna beam covers the entire geographic territory. For illustrative purposes throughout this description, it will be assumed that the geographic area to be serviced by both the point-to-point and broadcast services will be the United States. Accordingly, the broadcast service will be referred to hereinafter as CONUS (Continental United States).

The antenna system of the satellite 10 includes a conventional omni antenna 13 and two antenna subsystems for respectively servicing the point-to-point and CONUS systems. The point-to-point antenna subsystem provides a two-way communication link to interconnect earth stations for two-way communications. The CONUS antenna system functions as a transponder to broadcast, over a wide pattern covering the entire United States, signals received by one or more particular locations on earth. The point-to-point transmit signal and the CONUS receive signal are vertically polarized. The CONUS transmit and point-to-point receive signals are horizontally polarized. The antenna system includes a large reflector assembly 12 comprising two reflectors 12a, 12b. The two reflectors 12a, 12b are rotated relative to each other about a common axis and intersect at their midpoints. The reflector 12a is horizontally polarized and operates with horizontally polarized signals, while the reflector 12b is vertically polarized and therefore operates with vertically polarized signals. Consequently, each of the reflectors 12a, 12b reflects signals which the other reflector 12a, 12b transmits.

Figure 2:
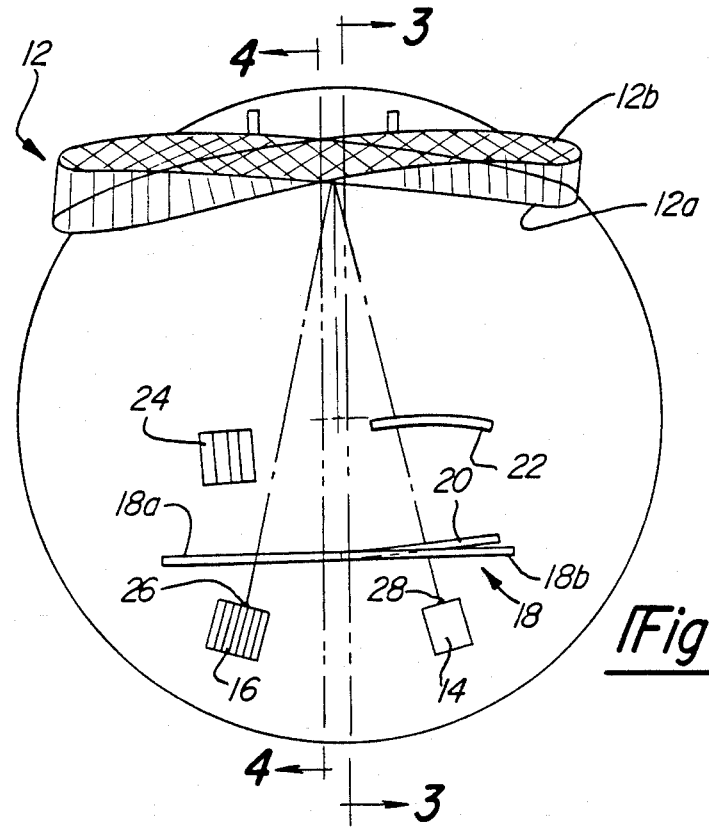
FIG. 2 is a top plan view of the antenna subsystems shown in FIG. 1.
Figure 4:
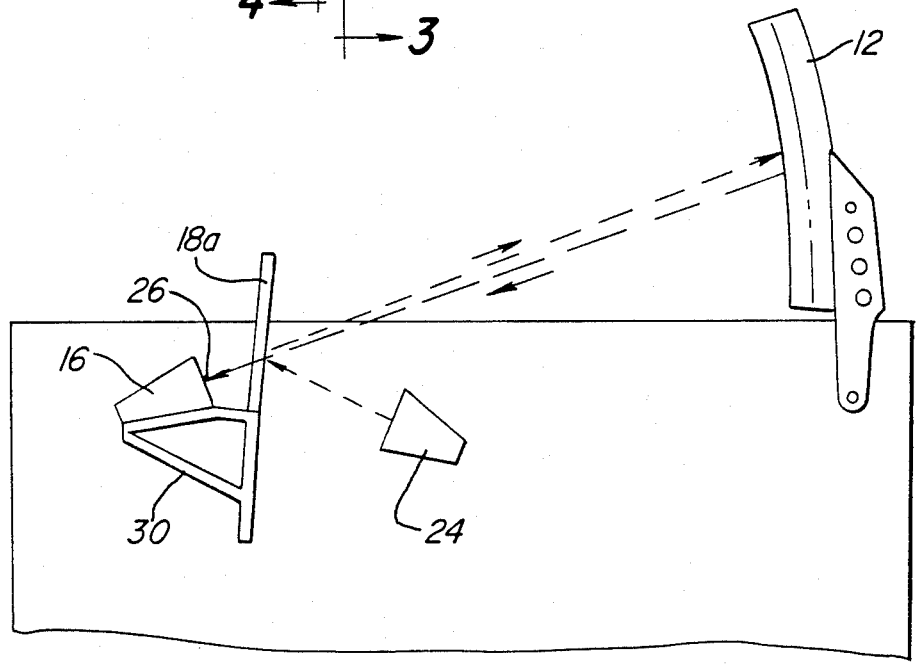
FIG. 4 is a sectional view taken along the line 4—4 in FIG. 2.

A frequency selective screen 18 is provided which includes two halves or sections 18a, 18b and is mounted on a support 30 such that the screen halves 18a, 18b are disposed on opposite sides of a centerline passing diametrically through the satellite 10, as best seen in FIG. 2. The frequency selective screen 18 functions as a diplexer for separating different bands of frequencies and may comprise an array of discrete, electrically conductive elements formed of any suitable material, such as copper. Any of various types of known frequency selective screens may be employed in this antenna system. However, one suitable frequency selective screen, exhibiting sharp transition characteristics and capable of separating two frequency bands which are relatively close to each other, is described in U.S. patent application Ser. No. 896,534, and assigned to Hughes Aircraft Company. The frequency selective screen 18 effectively separates the transmitted and received signals for both the CONUS and point-to-point subsystems. It may be appreciated that the two halves 18a, 18b of the screen 18 are respectively adapted to separate individual signals which are horizontally and vertically polarized.

Figure 6:
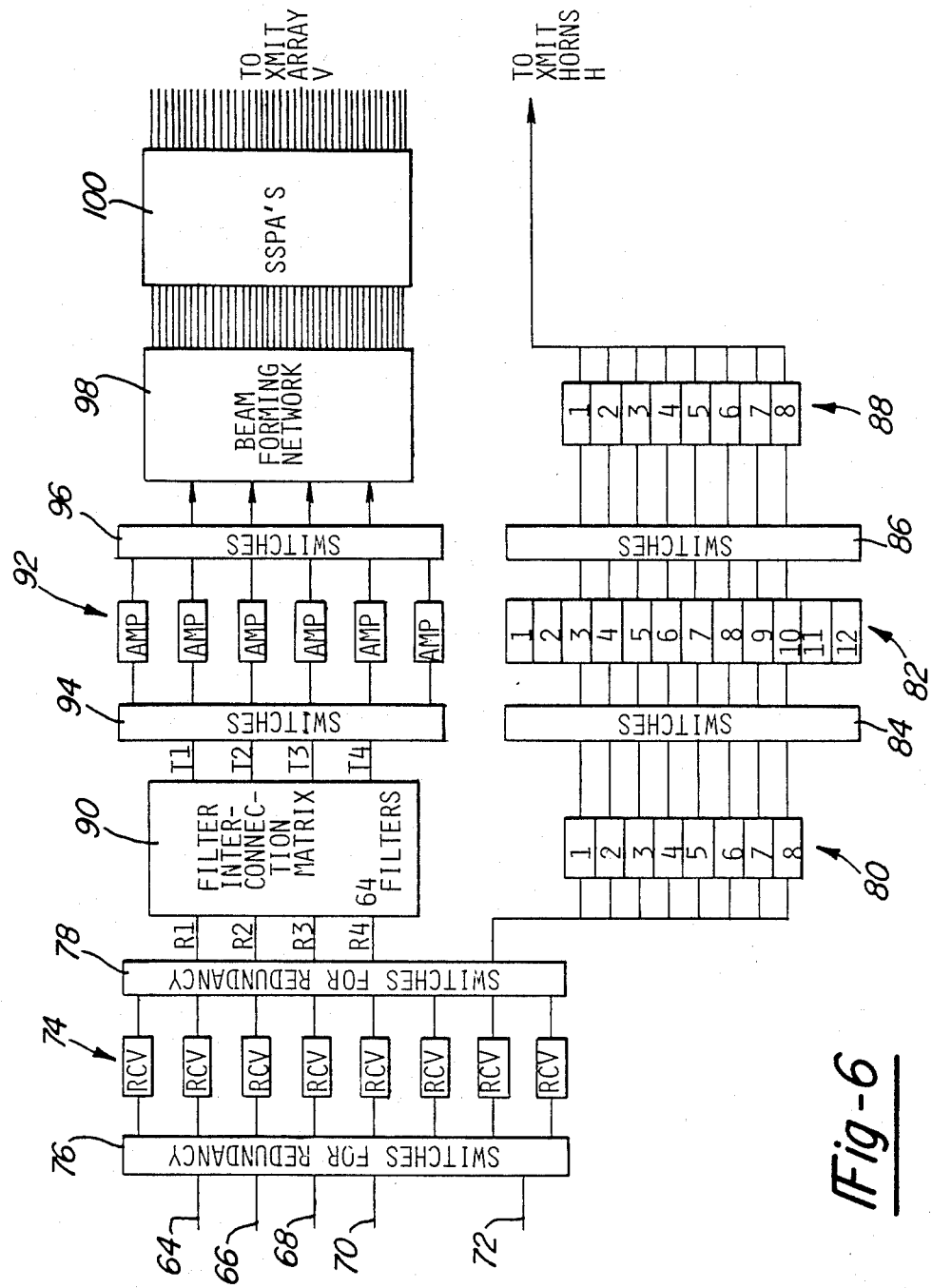
FIG. 6 is a block diagram of the communication electronics for the communications satellite.

The CONUS subsystem, which serves the entire country with a single beam, has, in this example, eight conventional transponders each having a high power traveling wave tube amplifier as its transmitter 82 (see FIG. 6). The CONUS receive antenna uses vertical polarization, sharing the vertically polarized reflector 12b with the point-to-point transmission system. CONUS receive signals pass through the frequency selective screen half 18b and are focused on the receive feed horns 14 located at the focal plane 28 of reflector 12b. The antenna pattern so formed is shaped to cover CONUS. The CONUS transmit antenna employs horizontal polarization, and shares reflector 12a with the point-to-point receive system. Signals radiating from the transmit feeds 24 are reflected by the horizontally polarized frequency selective screen 18a to reflector 12a whose secondary pattern is shaped to cover CONUS.

Figure 16:
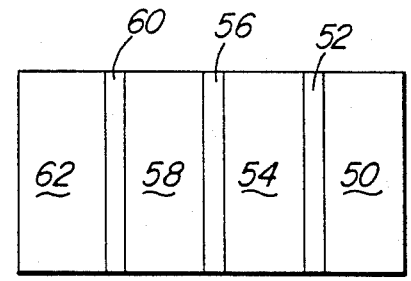
FIG. 16 is a front view of the receive feed horns for the point-to-point system.

The point-to-point subsystem broadly includes a transmit array 20, a subreflector 22, and receive feed horns 16. The transmit array 20, which will be described later in more detail, is mounted on the support 30, immediately beneath the screen 18. The subreflector 22 is mounted forward of the transmit array 20 and slightly below the screen 18. The signal emanating from the transmit array 20 is reflected by the subreflector 22 onto one half 18b of the screen 18. The subreflector 22 in conjunction with the main reflector 12 functions to effectively magnify and enlarge the pattern of the signal emanating from the transmit array 20. The signal reflected from the subreflector 22 is, in turn, reflected by one half 18b of the screen 18 onto the large reflector 12b, which in turn reflects the point-to-point signal to the earth. Through this arrangement, the performance of a large aperture phase array is achieved. The receive feed horns 16 are positioned in the focal plane 26 of the reflector 12a. It consists of four main horns 50, 54, 58, 62 and three auxiliary horns 52, 56, 60 as shown in FIG. 16.

Figure 13:
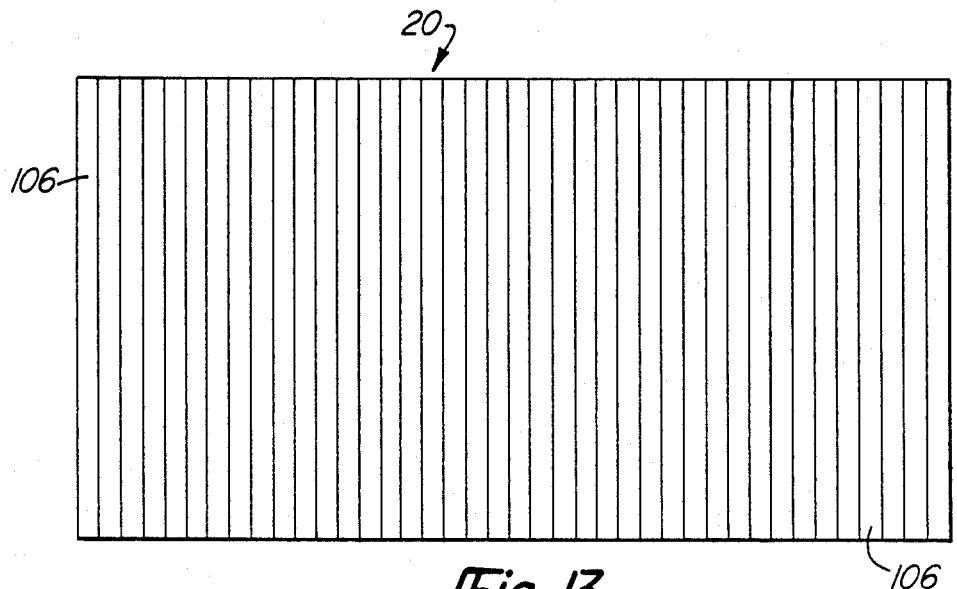
FIG. 13 is a front elevational view of the transmit array for the point-to-point system, the horizontal slots in each transmit element not being shown for sake of simplicity.
Figure 14:
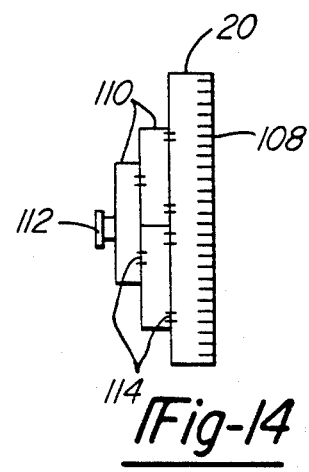
FIG. 14 is a side view of the transmit element of the array shown in FIG. 13 and depicting a corporate feed network for the element.
Figure 15:
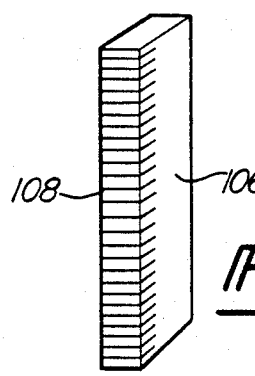
FIG. 15 is a front, perspective view of one of the transmit elements employed in the transmit array of FIG. 13.

Referring now also to FIGS. 13–15, the transmit array 26 comprises a plurality, for example forty, transmit waveguide elements 106 disposed in side-by-side relationship to form an array, as shown in FIG. 13. Each of the transmit waveguide elements 106 includes a plurality, for example twenty-six, of horizontal, vertically spaced slots 108 therein which result in the generation of a vertically polarized signal. As shown in FIG. 14, the transmit array 20 is fed with a transmit signal by means of a corporate feed network, generally indicated by the numeral 110 which excites the array element in four places 114. The purpose of the corporate feed network 110 is to provide a broadband match to the transmit waveguide element 106. Signals input to the waveguide opening 112 excite the array slots 108 so that the slot excitation is designed to give a flat pattern in the north-south direction.

Figure 5:
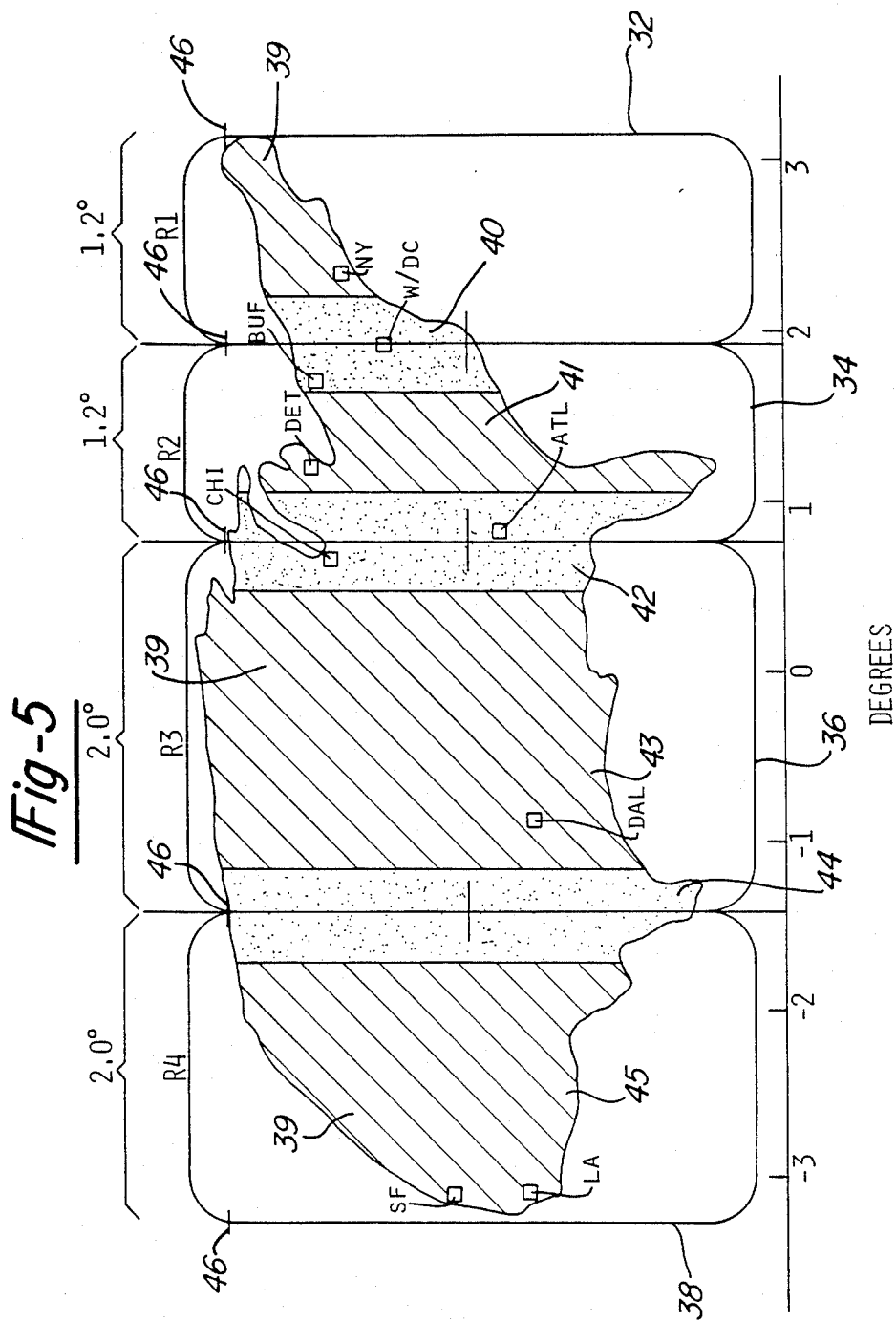
FIG. 5 is a view of the United States and depicts multiple, contiguous receive zones covered by the satellite of the present invention, the primary areas of coverage being indicated in a cross-hatching and the areas of contention being indicated by a dimpled pattern.

Attention is now directed to FIG. 5 which depicts a generally rectangular beam coverage provided by the horizontally polarized point-to-point receive system. In this particular example, the area serviced by the point-to-point system is the continental United States. The point-to-point receive system comprises four beams R1, R2, R3, R4 respectively emanating from the four uplink zones 32, 34, 36, 38 to the satellite, wherein each of the beams R1-R4 consists of a plurality of individual uplink beams originating from individual sites in each zone 32, 34, 36, 38 and carries an individual signal from that site. The uplink beam signals from the individual sites are arranged into a plurality of channels for each zone. For example, zone 32 may include a plurality, e.g. sixteen 27 MHz channels with each of such channels carrying hundreds of individual beam signals from corresponding uplink sites in zone 32.

The signal strength for each of the four beam pattern contours, respectively designated by numerals 32, 34, 36 and 38, are approximately 3 dB down from peaks of their respective beams. The antenna beams have been designed to achieve sufficient isolation between them to make feasible in the cross-hatched regions 39, 41, 43, 45 reuse of the frequency spectrum four times. In the dotted regions 40, 42, and 44, the isolation is insufficient to distinguish between signals of the same frequency originating in adjacent zones. Each signal originating in these regions will generate two downlink signals, one intended and one extraneous. The generation of extraneous signals in these areas will be discussed later in more detail.

It may be readily appreciated from FIG. 5 that the four zones covered by beams 32, 34, 36, 38 are unequal in width. The East Coast zone covered by beam 32 extends approximately 1.2 degrees; the Central zone covered by beam 34 extends approximately 1.2 degrees; the Midwest zone covered by beam pattern 36 extends approximately 2.0 degrees, and; the West Coast zone covered by beam pattern 38 extends approximately 2.0 degrees. The width of each of the four receive zones 32, 34, 36 and 38 is determined by the number of terminals and thus the population density in the various regions of the country. Thus, beam pattern 32 is relatively narrow to accommodate the relatively high population density in the Eastern part of the United States while beam pattern 36 is relatively wide due to the relatively low population density in the Mountain states. Since each zone utilizes the entire frequency spectrum, zone widths are narrower in regions where the population density is high, to accommodate the greater demand for channel usage.

Figure 9:
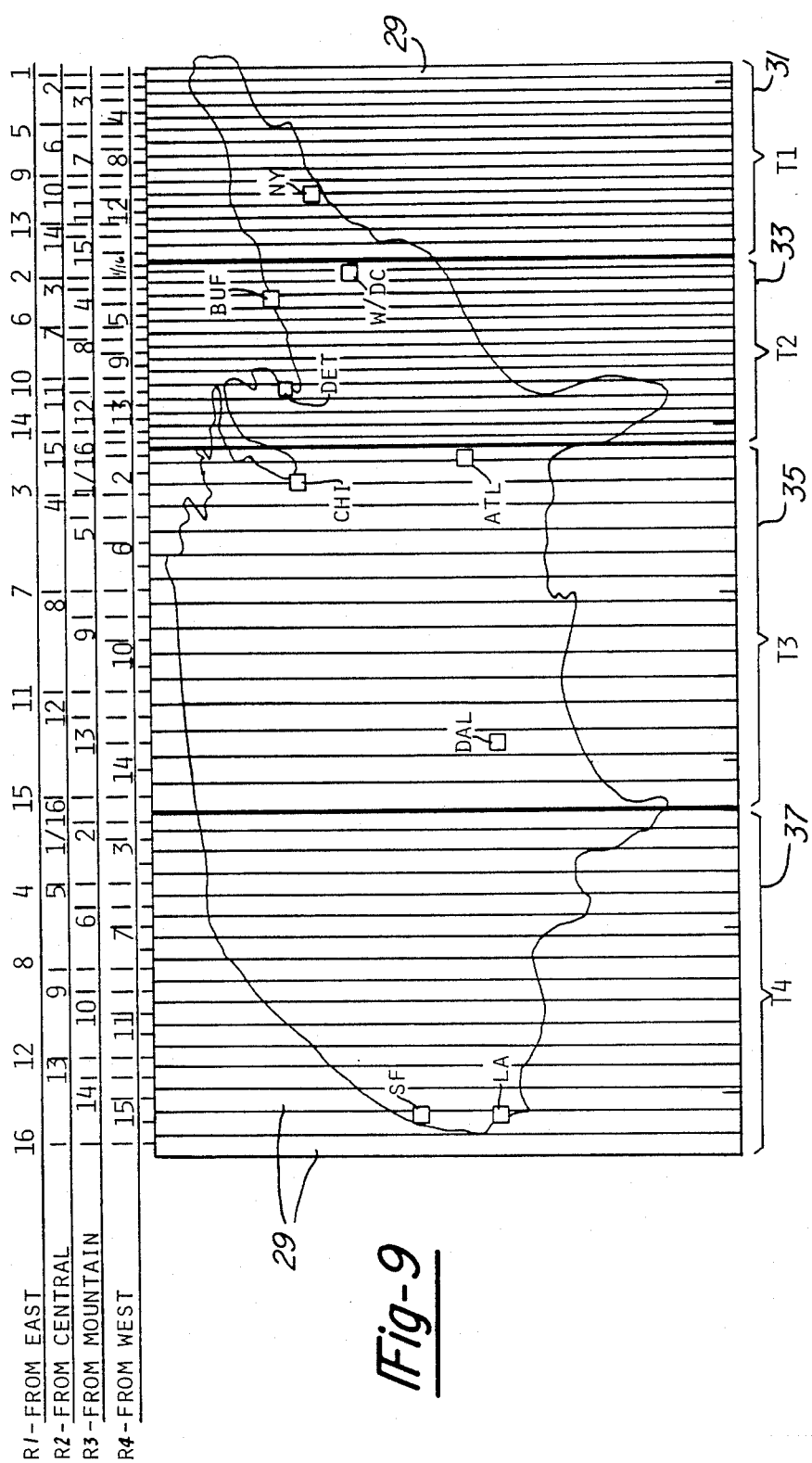
FIG. 9 is a diagrammatic view of the United States depicting multiple contiguous transmit zones covered by the satellite and the geographic distribution of the interconnected channels for each zone, across the United States.

As shown in FIG. 9, the point-to-point transmit system comprises four beams T1, T2, T3, T4 respectively covering the four transmit zones 31, 33, 35, 37, wherein each of the beams T1-T4 consists of a plurality of individual downlink beams destined for the individual downlink sites in each zone 31, 33, 35, 37 and carries an individual signal to that site. The downlink beam signals, destined to be received at the individual downlink sites, are arranged into a plurality of channels for each zone. For example, zone 31 may include a plurality, e.g. sixteen 27 MHz channels with each of such channels carrying hundreds of individual beam signals to corresponding downlink sites in zone 32.

The use of multiple downlink zones and downlink zones of unequal widths assist in causing the intermodulation products, generated by the later-discussed solid state power amplifiers, to be geographically dispersed in a manner which prevents most of these products from being received at the ground terminals. The net effect is that the amplifiers may be operated more efficiently because the system can tolerate more intermodulation products. Although the widths of the transmit zones 31, 33, 35, 37 are nearly the same as those of the receive zones R1, R2, R3, R4, small differences between the two sets have been found to optimize the capacity of the system.

Figure 9A:
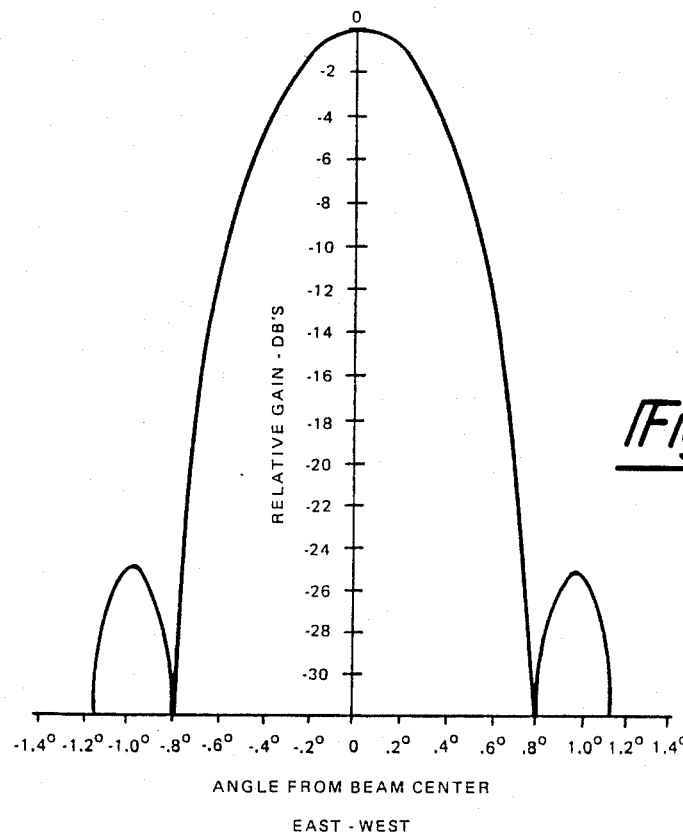
FIG. 9A is a graph showing the variation in gain of the transmit antenna beam for each zone in the point-to-point system in relation to the distance from the center of the beam in the east-west direction.

The half power beam width of the individual transmit beams 29 is substantially narrower than that of the transmit zones 31, 33, 35, 37. This results in the desirable high gain, and avoids the zones of contention 40, 42, 44 characteristic of the receive zone arrangement. These individual beams 29 must be steered within the zones in order to maximize the downlink EIRP in the directions of the individual destination terminals. The transmit point-to-point frequency addressable narrow beams 29 are generated by an array 20 whose apparent size is magnified by two confocal parabolas comprising a main reflector 12b and a subreflector 22. The east-west direction of each beam 29 is determined by the phase progression of its signal along the array 106 of transmit elements 20 (FIGS. 13 and 15). This phase progression is established by a later-discussed beam-forming network 98 and is a function of the signal frequency. Each of the transmit array elements 20 is driven by a later-discussed solid state power amplifier. The power delivered to the array elements 106 is not uniform but is instead tapered with the edge elements being more than 10 dB down. Tapering of the beams 29 is achieved by adjusting the transmit gain according to the position of the transmit array elements 20. The excitation pattern determines the characteristics of the transmit secondary pattern, shown in FIG. 9A. Referring to FIG. 9, the closest spacing between transmit zones 31, 33, 35, 37 occurs between zones 31 and 33 and is approximately 1.2 degrees. This means that a signal addressed to zone 33 using a particular frequency would interfere with a signal using the same frequency in zone 31 with its side lobe 1.2 degrees from its beam center. However, the individual transmit gains have been adjusted to provide low side lobe levels, thereby permitting frequency reuse in adjacent zones. Referring to FIG. 9A, it is seen that the side lobe level at this angle off beam center is more than 30 dB down, so that such interference will be negligibly small. The same frequency uses in zones 35 and 37 are further removed in angle, hence the side lobe interference in those zones is even smaller.

Figure 9B:
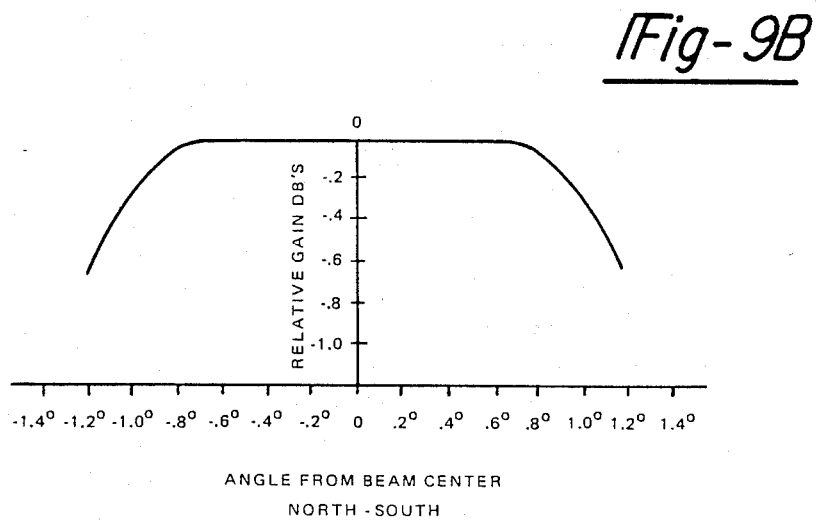
FIG. 9B is a graph similar to FIG. 9A but showing the variation in gain in the north-south direction.

FIG. 9B is an illustration of the transmit beam pattern in the north-south direction. The twenty six slots 108 in each of the transmit waveguide elements 106 are excited in a manner which creates a nearly flat north-south pattern, extending over the covered range of plus and minus 1.4 degrees from the north-south boresight direction.

Both the point-to-point and CONUS systems may utilize the same uplink and downlink frequency bands, with the point-to-point system using horizontal polarization for its uplink polarization, and the CONUS system using vertical polarization, as previously mentioned. For example, both services may, simultaneously, utilize the entire 500 MHz uplink frequency band between 14 and 14.5 GHz, as well as the entire 500 MHz downlink frequency band between 11.7 and 12.2 GHz. Each of the receive zones 32, 34, 36, 38 and transmit zones 31, 33, 35, 37, employing the point-to-point service utilizes the entire frequency spectrum (i.e. 500 MHz). Furthermore, this total frequency spectrum is divided into a plurality of channels, for example, sixteen channels each having a usable bandwidth of 27 MHz and a spacing of 30 MHz. In turn, each of the sixteen channels may accommodate approximately 800 subchannels. Hence, within each zone, approximately 12,500 (16 channels×800 subchannels) 32 kilobit per second channels may be accommodated, at any given moment. As will be discussed below, the communication architecture of the point-to-point system allows any terminal to communicate directly with any other terminal. Thus, within a single polarization, a total of 50,000 subchannels may be accommodated nationwide.

Referring now particularly to FIGS. 1, 2, 6, 7 and 16, the point-to-point receive feed array 16 employs seven receive horns 50–62. Horns 50, 54, 58 and 62 respectively receive signals from zones 32, 34, 36 and 38.

Horns 52, 56 and 60 receive signals from the zones of contention 40, 42 and 44. Using a series of hybrid couplers or power dividers $C_1$–$C_9$, the signals received by horns 50–62 are combined into four outputs 64–70. For example, a signal originating from the area of contention 44 and received by horn 60 is divided by coupler $C_2$ and portions of the divided signal are respectively delivered to couplers $C_1$ and coupler $C_4$ whereby the split signal is combined with the incoming signals received by horns 58, 62 respectively. Similarly, signals originating from the area of contention 42 and received by horn 56 are split by coupler $C_5$. A portion of the split signal is combined, by coupler $C_3$, with the signal output of coupler $C_4$, while the remaining portion of the split signal is combined, by coupler $C_7$, with the signal received by horn 54.

Figure 3:
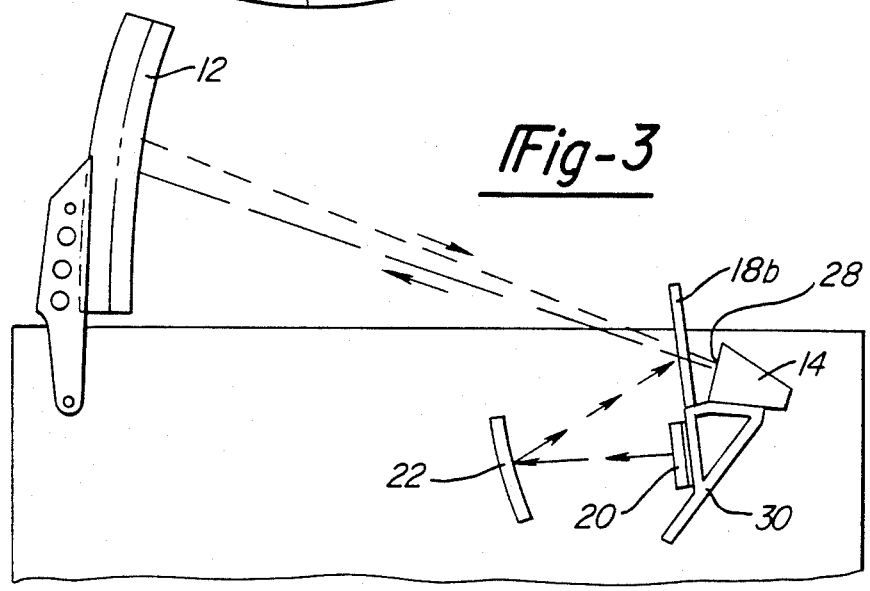
FIG. 3 is a sectional view taken along the line 3—3 in FIG. 2.

Attention is now particularly directed to FIG. 6 which depicts, in block diagram form, the electronics for receiving and transmitting signals for both the CONUS and point-to-point systems. The point-to-point receive signals 64–70 (see also FIG. 7) are derived from the point-to-point receive feed network in FIG. 7, whereas the CONUS receive signal 72 derives from the CONUS receive feed horns 14, (FIGS. 1 and 3). Both the point-to-point and CONUS receive signal are input to a switching network 76 which selectively connects input lines 64–72 with five corresponding receivers, eight of which receivers are generally indicated at 74. The receivers 74 are of conventional design, three of which are provided for redundancy and are not normally used unless a malfunction in one of the receivers is experienced. In the event of a malfunction, switching network 76 reconnects the appropriate incoming line 64–72 with a back-up receiver 74. Receivers 74 function to drive the filters in a filter interconnection matrix 90. The outputs of the receivers 74, which are connected with lines 64–70, are coupled by a second switching network 78 through four receive lines R1–R4 to a filter interconnection matrix 90. As will be discussed later below, the filter interconnection matrix (FIM) provides interconnections between the receive zones 32, 34, 36, 38, and the transmit zones 31, 33, 35, 37. Operating in the above-mentioned 500 MHz assigned frequency spectrum, separated into sixteen 27 MHz channels, four sets of sixteen filters are employed. Each set of the sixteen filters utilizes the entire 500 MHz frequency spectrum and each filter has a 27 MHz bandwidth. As will be discussed later, the filter outputs T1–T4 are arranged in four groups, each group destined for one of the four transmit zones 31, 33, 35, 37.

The transmit signals T1–T4 are respectively connected, via switching network 94, to four of six driving amplifiers 92, two of such amplifiers 92 being provided for a back-up in the event of failure. In the event of the failure of one of the amplifiers 92, one of the back-up amplifiers 92 will be reconnected to the corresponding transmit signal T1–T4 by the switching network 94. A similar switching network 96 couples the amplified output of the amplifiers 92 to a beam-forming network 98. As will be discussed later in more detail, the beam-forming network 98 consists of a plurality of transmission delay lines connected at equal intervals along the four delay lines. These intervals and the width of the delay lines are chosen to provide the desired centerband beam squint and the beam scan rate with frequency for the corresponding transmit zones 31, 33, 35, 37 to be serviced. The transmit signals, coupled from the four delay lines, are summed in the beam-forming network 98 as shown in FIGS. 11 and 12, to provide inputs to solid state power amplifiers 100, which may be embedded in the point-to-point system's transmit array 20. In the illustrated embodiment discussed below, forty solid state power amplifiers (SSPAs) 100 are provided. Each of the SSPAs 100 amplifies a corresponding one of the forty signals formed by the beamforming network 98. The SSPAs 100 possess different power capacities to provide the tapered array excitation previously mentioned. The output of the SSPA 100 is connected to the input 112 (FIG. 14) at one of the elements of the transmit array 20.

The receive signal for CONUS on line 72 is connected to an appropriate receiver 74 by switching networks 76, 78. The output of the receiver connected with the CONUS signal is delivered to an input multiplexer 80 which provides for eight channels, as mentioned above. The purpose of the input multiplexers 80 is to divide the one low level CONUS signal into subsignals so that the subsignals can be amplified on an individual basis. The CONUS receive signals are highly amplified so that the CONUS transmit signal may be distributed to very small earth terminals. The outputs of the input multiplexer 80 are connected through a switching network 84 to eight of twelve high power traveling wave tube amplifiers (TWTAs) 82, four of which TWTAs 82 are employed for backup in the event of failure. The outputs of the eight TWTAs 82 are connected through another switching network 86 to an output multiplexer 88 which recombines the eight amplified signals to form one CONUS transmit signal. The output of the multiplexer 88 is delivered via waveguide to the transmit horns of the CONUS transmitter 24 (FIGS. 2 and 3).

Figure 10:
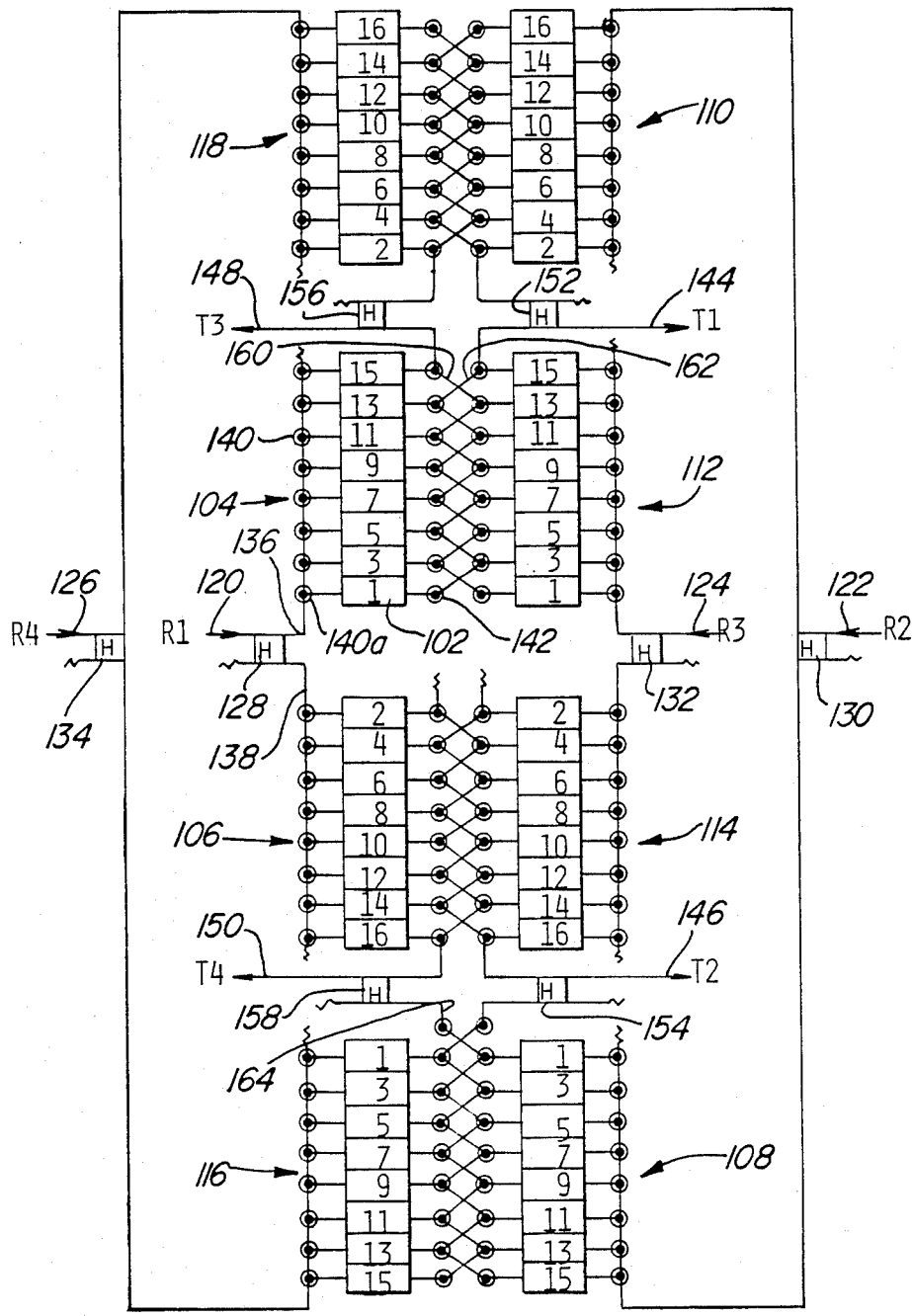
FIG. 10 is a detailed schematic diagram of the filter interconnection matrix employed in the point-to-point system.

Attention is now directed to FIG. 10 which depicts the details of the FIM 90 (FIG. 6). As previously discussed, the FIM 90 effectively interconnects any terminal in any of the receive zones 32, 34, 36, 38 (FIGS. 5) with any terminal in any of the transmit zones 31, 33, 35, 37. The FIM 90 includes four waveguide inputs 120, 122, 124 and 126 for respectively receiving the receive signals R1, R2, R3 and R4. As previously mentioned, receive signals R1-R4, which originate from a corresponding receive zone 32, 34, 36, 38 (FIG. 5), each contain the entire assigned frequency spectrum, (e.g. 500 MHz), and are separated into a plurality of channels, (e.g. sixteen 27 MHz channels). The channels are further separated into a plurality of subchannels, where each of the subchannels carries a signal from a corresponding uplink site. The FIM 90 includes 64 filters, one of which is indicated by the numeral 102. Each of the filters 102 has a passband corresponding to one of the channels (e.g. 1403-1430 MHz). The filters 102 are arranged in four groups, one for each receive zone 32, 34, 36, 38, with each group including two banks or subgroups of eight filters per subgroup. One subgroup of filters 102 contains those filters for the even-numbered channels and the other subgroup in each group contains eight filters for the odd-numbered channels. Thus, for example, the filter group for receive signal R1 comprises subgroup 104 of filters 102 for odd channels, and subgroup 106 of filters 102 for even channels. The following table relates the receive signals and zones to their filter subgroups:

| Receive Zone | Receive Signal | Filter Subgroups | |
|---|---|---|---|
| | | Odd Channels | Even Channels |
| 32 | R1 | 104 | 106 |
| 34 | R2 | 108 | 110 |
| 36 | R3 | 112 | 114 |
| 38 | R4 | 116 | 118 |

The filters are grouped in a unique manner such that when the receive signals R1-R4 are filtered, the filtered outputs are combined to form the transmit signals. The transmit signals T1-T4 also utilize the entire assigned frequency spectrum, (e.g. 500 MHz). In the illustrated embodiment, each of the transmit signals T1-T4 possesses sixteen 27 MHz wide channels, and comprises four channels from each of the four receive zones 32-38 (FIG. 5).

The incoming receive signals R1-R4 are divided into the corresponding subgroups by respectively associated hybrid couplers 128-134 which effectively divert 50% of the signal power to each subgroup. Hence, for example, one-half of the R1 signal input at waveguide 120 is diverted to transmission line 136 which services the subgroup 104 of filters 102, and the remaining half of the R1 signal is diverted to transmission line 138 which services subgroup 106 of filters 102. In a similar manner, each of the subgroups 104-118 of filters 102 is served by a corresponding distribution line, similar to lines 136 and 138.

The construction of subgroup 104 will now be described in more detail, it being understood that the remaining subgroups 106-118 are identical in architecture to subgroup 104. At intervals along the transmission line 136, there are eight ferrite circulators 140, one associated with each of the odd-numbered channel filters 102. The function of the circulators 140 is to connect the transmission line 136 to each of the odd channel filters 102 in a lossless manner. Thus, for example, the R1 signal enters the first circulator 140a and circulates it counterclockwise whereby the 27 MHz band of signals corresponding to channel 1 passes through it to circulator 142. All other frequencies are reflected. These reflected signals propagate via the circulator toward the next filter where the process is repeated. Through this process, the R1 receive signal is filtered into sixteen channels by the sixteen filters 104-108 corresponding to the R1 signals. hence, the R1 signal with frequencies in the range of channel 1 will pass through the first ferrite circulator 140a and it will be filtered by filter 1 of group 104.

Figures 7, 8:
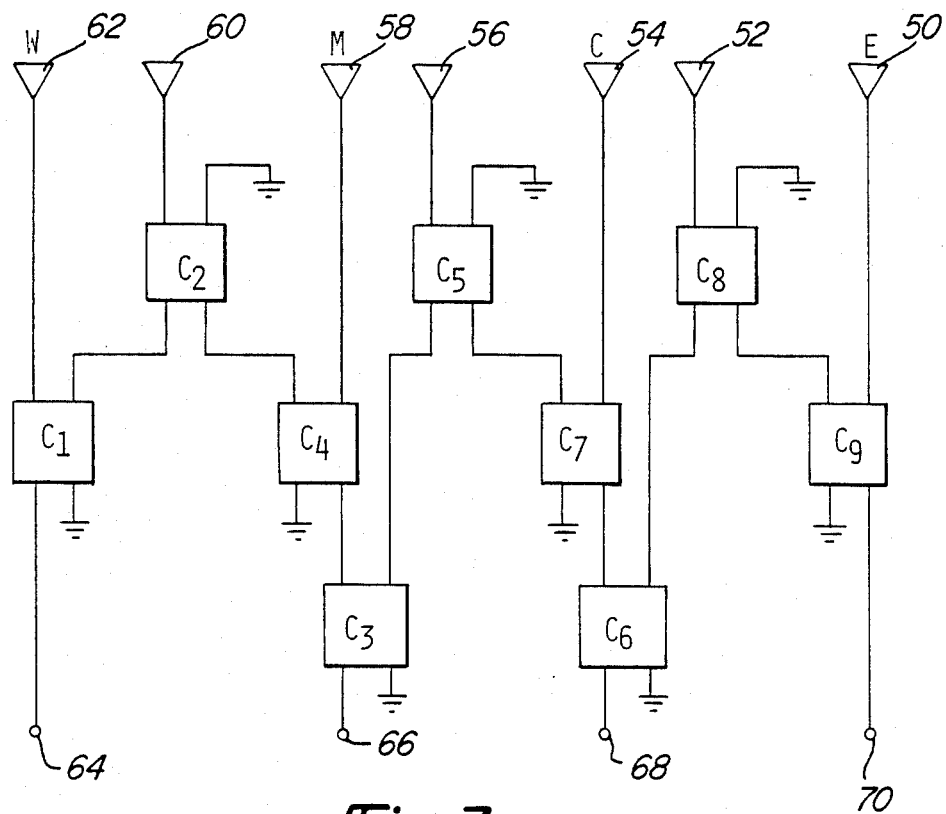
FIG. 7 is a schematic diagram of a coupling network which interconnects the point-to-point receive feed horns with the inputs to the communications electronics shown in FIG. 6.
FIG. 8 is a reference table of the interconnect channels employed to connect the receive and transmit zones for the point-to-point system.

The outputs from a filter subgroup 104-118 are selectively coupled by a second set of ferrite circulators 142 which sums, in a criss-cross pattern, the outputs from an adjacent group of filters 102. For example, the outputs of channel filters 1, 5, 9, and 13 of group 104 are summed with the outputs of channel filters 3, 7, 11 and 15 of filter group 112. This sum appears at the output terminal for T1 144. Referring to FIG. 8, these signals correspond to the connections between receive zones R1 and R3 and to transmit zone T1.

Attention is now directed to FIG. 8 and 9 which depict how the transmit and receive signals are interconnected by the FIM 90 to allow two-way communication between any terminals. Specifically, FIG. 8 provides a table showing how the receive and transmit zones are connected together by the interconnect channels while FIG. 9 depicts how these interconnect channels are distributed geographically across the transmit zones 31, 33, 35, 37. In FIG. 8, the receive signals R1–R4 are read across by rows of interconnect channels and the transmit signals T1–T4 are read by columns of interconnect channels. It can be readily appreciated from FIG. 8 that each of the transmit signals T1–T4 is made up of sixteen channels arranged in four groups respectively, where each group is associated with one of the receive signals R1–R4. The satellite communications system of the present invention is intended to be used in conjunction with a ground station referred to as a satellite network control center which coordinates communications between the ground terminals via packet switched signals. The network control center assigns an uplink user with an uplink frequency based on the location of the desired downlink, assigning the available frequency whose downlink longitude is closest to that of the destination. The frequency addressable downlink transmit beams 29 are thus addressed by the frequencies of the uplink signals. This strategy maximizes the gain of the downlink signal.

As shown in FIG. 9, the continental United States is divided into four primary zones 31, 33, 35, 37. Zone 31 may be referred to as the East Coast zone, zone 33 is the Central zone, zone 35 is the Mountain zone, and zone 37 is the West Coast zone. As previously mentioned, each of the zones 31, 33, 35, 37 utilizes the entire assigned frequency spectrum (e.g. 500 MHz). Thus, in the case of a 500 MHz assigned frequency band, there exists sixteen 27 MHz channels plus guard bands in each of the zones 31, 33, 35, 37.

The numbers 1–16 repeated four times above the beams 29 in FIG. 9 indicate the longitude of the beams corresponding to the center frequencies of the channels so numbered. Because of the frequency sensitivity of the beams, the longitude span between the lowest and highest frequency narrow band signal in a channel is approximately one channel width. Each beam is 0.6 degrees wide between its half power point, about half the zone width in the East Coast and Central zones and nearly one-third the zone width in the Mountain and West Coast zones. The antenna beams 29 overlap each other to ensure a high signal density; the more that the beams overlap, the greater channel capacity in a given area. Hence, in the East Coast zone 31, there is a greater overlap than in the Mountain zone 35 because the signal traffic in the East Coast zone 31 is considerably greater than that in the Mountain zone 35.

The interconnect scheme described above will now be explained by way of a typical communication between terminals in different zones. In this example, it will be assumed that a caller in Detroit, Michigan wishes to place a call to a terminal in Los Angeles, California. Thus, Detroit, Michigan, which is located in the Central zone 34, is the uplink site, and Los Angeles, California, which is located in the West Coast zone 37, is the downlink destination. As shown in FIG. 9, each geographic location in the continental United States can be associated with a specific channel in a specific zone. Thus, Los Angeles is positioned between channels 14 and 15 in transmit zone 37.

Referring now concurrently to FIGS. 5, 8 and 9 particularly, receive and transmit zones R1 and T1 lie within the East Coast zone 32 and 31, R2 and T2 lie within the Central zone 34 and 33, R3 and T3 lie within the Mountain zone 36 and 35, and R4 and T4 lie within the West Coast zone 38 and 37. Since Detroit lies in the Central or R2 zone 34, it can be seen that the only channels over which signals can be transmitted to the West Coast or T4 zone 37 are channels 1, 5, 9 and 13. This is determined in the table of FIG. 8 by the intersection of row R2 and column T4. Therefore, from Detroit, the uplink user would uplink on either channel 1, 5, 9 and 13, whichever of these channels is closest to the downlink destination. Since Los Angeles is located between channels 14 and 15, the network control center would uplink the signal on channel 13 because channel 13 is the closest to channel 14. The downlink beam width is broad enough to provide high gain at Los Angeles.

Conversely, if the uplink site is in Los Angeles and the downlink destination is in Detroit, the intersection of row R4 and column T2 in FIG. 8 must be consulted. This intersection reveals that the signal can be transmitted on channels 1, 5, 9 or 13 depending upon which channel is closest to the downlink destination. The network control center would uplink the signal from Los Angeles on channel 9 since channel 9 is closest to channel 11 which, in turn, is closest to Detroit.

Returning now to FIG. 10, the conversion of a receive signal to a transmit signal will be described in connection with the example mentioned above in which the uplink site is in Detroit and the downlink site is in Los Angeles. The uplink signal transmitted from Detroit would be transmitted on channel 13 carried by receive signal R2. Thus, the R2 receive signal is input to transmission line 122 and a portion of such input signal is diverted by the hybrid coupler 130 to the input line of subgroup 108 of filters 102. Subgroup 108 includes a bank of eight filters for the odd channels, including channel 13. Thus, the incoming with other signals from subgroups 108 and 116. The channel 13 signal present on line 164, is combined by the hybrid coupler 158, with signals emanating from subgroup 106 and 114, and forms the T4 signal on output line 150. The transmit signal T4 is then downlinked to Los Angeles.

It is to be understood that the above example is somewhat simplified inasmuch as the network control center would assign a more specific channel than a 27 MHz wide band channel, since the 27 MHz wide channel may actually comprise a multiplicity of smaller channels, for example, 800 subchannels of 32 KHz bandwidth.

Referring now again to FIGS. 5, 8 and 9, in the event that an uplink signal originates from one of the areas of contention, 40, 42, 44 (FIG. 5), such signal will not only be transmitted to its desired downlink destination, but a non-neglible signal will be transmitted to another geographic area. For example, assume that the uplink signal originates from Chicago, Illinois which is in the area of contention 42 and that the signal is destined for Los Angeles, California. The area of contention 42 is produced by the overlap of the beams forming zones 34 and 36. Hence, the uplink signal can be transmitted as receive signals R2 or R3. The network control center determines whether the uplink communication is carried by receive signals R2 or R3. In the present example, since Chicago is closer to zone 36, the uplink communication is carried on receive signal R3.

As previously discussed, the downlink destination, Los Angeles, is located in zone 37 and lies between channels 14 and 15. As shown in FIG. 8, the intersection of R3 with column T4 yields the possible channels over which the communication can be routed. Thus, the Chicago uplink signal will be transmitted over one of channels 2, 6, 10 or 14. Since Los Angeles is closest to channel 14, channel 14 is selected by the network control center as the uplink channel. Note, however, that an undesired signal is also transmitted from zone 34 on channel 14. To determine where the undesired signal will be downlinked, the table of FIG. 8 is consulted. The table of FIG. 8 reveals that uplink signals carried on channel 14 in the R2 zone 34 are downlinked to the T1 transmit zone 31. The desired signal is transmitted to Los Angeles and the undesired signal (i.e. an extraneous signal) is transmitted to the East Coast (i.e. zone 31). The network control center keeps track of these extraneous signals when making frequency assignments. The effect of these extraneous signals is to reduce slightly the capacity of the system.

Referring now again to FIG. 6, the beam-forming network 98 receives the transit signals T1-T4 and functions to couple all of the individual communication signals in these transmit signals together so that a transmit antenna beam for each signal is formed. In the example discussed above in which the assigned frequency spectrum is 500 MHz, a total of approximately 50,000 overlapping antenna beams are formed by the beam-forming network 98 when the system is fully loaded with narrow band signals. Each antenna beam is formed in a manner so that it can be pointed in a direction which optimizes the performance of the system. The incremental phase shift between adjacent elements determines the direction of the antenna beam. Since this phase shift is determined by the signal frequency, the system is referred to as frequency addressed.

Attention is now directed to FIGS. 11 and 12 which depict the details of the beam-forming network 98. The beam-forming network, generally indicated by the numeral 98 in FIG. 11, is arranged in the general form of an arc and may be conveniently mounted on the communication shelf (not shown) of the satellite. The arc shape of the beam-forming network 98 facilitates an arrangement which assures that the paths of the signals passing therethrough are of correct length.

The beam-forming network 98 includes a first set of circumferentially extending transmission delay lines 168, 170, a second set of transmission delay lines 172, 174 which are radially spaced from delay lines 168 and 170, and a plurality of radially extending waveguide assemblies 176. In the illustrated embodiment, forty waveguide assemblies 176 are provided, one for each of the elements 106 of the transmit array 20 (FIG. 13). The waveguide assemblies 176 intersect each of the delay lines 168-174 and are equally spaced in angle.

Each of the waveguide assemblies 176 defines a radial line summer and intersects each of the delay lines 168-174. As shown in FIG. 12, at the points of intersection, between the radial line summers 176 and the transmission delay lines 168-174, a crossguide coupler 180 is provided. The crossguide coupler 180 connects the delay lines 168-174 with the radial line summers 176. The function of the crossguide couplers 180 will be discussed later in more detail.

Four delay lines 168-174 are provided respectively for the four transmit zones T1-T4 (FIG. 9). Hence, transmit signal T1 is provided to the input of delay line 170, T2 is provided to input of delay line 168, T3 is provided to the input of delay line 174, and T4 is provided to the input of delay line 172. As shown in FIG. 12, the distance between the radial line summers is indicated by the letter "l" and the width of each of the radial delay lines is designated by the letter "w". Although the radial line summers 176 are spaced at equal angular intervals along the delay lines 168-174, the distance between them varies from delay line to delay line due to the fact that the delay lines 168-174 are radially spaced from each other. Thus, the further from the center of the arc, which is formed by the radial line summers 176, the greater the distance between the radial line summers 176, at the point where they intersect with the delay lines 168-174. In other words, the spacing "l" between radial line summers 176 for delay line 168 is less than the spacing between adjacent radial line summers 176 than for delay line 174. Typical values for the dimensions "l" and "w" are as follows:

| Delay Line | Signal | l, inches | w, inches |
| --- | --- | --- | --- |
| 168 | T2 | 1.66 | 0.64 |
| 170 | T1 | 1.72 | 0.66 |
| 172 | T4 | 2.45 | 0.74 |
| 174 | T3 | 2.55 | 0.76 |

The width of the delay lines 168-174, "w", and the distance "l" between adjacent radial line summers are chosen to provide the desired center beam squint and beam scan rate so that the beam pointing is correct for each channel. This results in the desired start and stop points for each of the transmit zones T1-T4.

Referring particularly to FIG. 12, the transmit signal T2 propagates down the delay line 168 for a precise distance, at which point it reaches the first radial line summer 176. A portion of the T2 signal passes through the crossguide coupler 180, which may, for example, be a 20 dB coupler, such that one percent of the transmitted power of transmit signal T2 is diverted down the radial line summer 176. This diverted energy then propagates down the waveguide 176 towards a corresponding solid state power amplifier 100 (FIGS. 6 and 11). This process is repeated for signal T1 which propagates down delay line 170. The portions of signals T1 and T2 which are diverted by the crossguide couplers 180 (i.e. 0.01 T1 and 0.01 T2) are summed together in the radial line summer 176 and the combined signal 0.01 (T1+T2) propagates radially outwardly toward the next set of delay lines 172, 174. This same coupling process is repeated for signals T3 and T4 in delay lines 174 and 172 respectively. That is, 0.01 of signals T3 and T4 are coupled via crossguide couplers 180 to the radial line summer 176. The resulting combined signal 0.01 (T1+T2+T3+T4) propagates radially outwardly to an associated solid state power amplifier 100 where it is amplified in preparation for transmission.

After encountering the first radial line summer 176, the remaining 0.99 of signals T1-T4 propagate to the second radial line summer where an additional one percent of the signals is diverted to the summer 176. This process of diverting one percent of the signals T1-T4 is repeated for each of the radial line summers 176.

The signals, propagating through the radial line summers 176 towards the SSPAs 100, are a mixture of all four point-to-point transmit signals T1-T4. However, each of the transmit signals T1-T4 may comprise 12,500 subsignals. Consequently, the forty signals propagating through the radial line summers 176 may be a mixture of all 50,000 signals in the case of the embodiment mentioned above where the assigned frequency spectrum is 500 MHz wide. Therefore, each of the SSPAs 100 amplifies all 50,000 signals which emanate from each of the plurality of wave guide assemblies 176.

Since each of the SSPAs 100 amplifies all 50,000 signals which are destined for all regions of the country, it can be appreciated that all of the narrow, high gain downlink beams are formed from a common pool of transmitters, i.e. all of the SSPAs 100. This arrangement may be thought of as effectively providing a nationwide pool of power since each of the downlink beams covering the entire country is produced using all of the SSPAs 100. Consequently, it is possible to divert a portion of this nationwide pool of power to accommodate specific, disadvantaged downlink users on an individual basis without materially reducing the signal power of the other beams. For example, a downlink user may be "disadvantaged" by rain in the downlink destination which attenuates the signal strength on the beam. Such a rain disadvantaged user may be individually accommodated by increasing the signal strength of the corresponding uplink beam. This is accomplished by diverting to the disadvantaged downlink beam, a small portion of the power from the pool of nationwide transmitter power (i.e. a fraction of the power supplied by all of the SSPAs 100). The power of an individual uplink beam is proportional to that of the corresponding downlink beam. Consequently, in order to increase the power of the downlink beam it is merely necessary to increase the power of the uplink beam.

In practice, the previously mentioned network control center keeps track of all of those regions of the country in which it is raining and determines which of the uplink users are placing communications to downlink destinations in rain affected areas. The network control center then instructs each of these uplink users, using packet switched signals, to increase its uplink power for those signals destined for a rain affected area. The increase in power of the uplink user's signals results in greater collective amplification of these signals by the SSPAs 100, to produce corresponding downlink beams to the rain affected areas, which have power levels increase sufficiently to compensate for rain attenuation. Typically, the number of signals destined for rain affected areas is small relative to the total number of signals being handled by the total pool of SSPAs 100. Accordingly, other downlink users not in the rain affected zones do not suffer substantial signal loss since the small loss that may occur in their signals is spread out over the many thousand users.

The SSPAs 100 (FIGS. 8 and 11) may be mounted, for example, on the rim of the communication shelf (not shown) of the satellite. The signals amplified by the SSPAs 100 are fed into the corresponding elements 106 of the transmit array 20 (FIG. 13 and 14).

Figure 17:
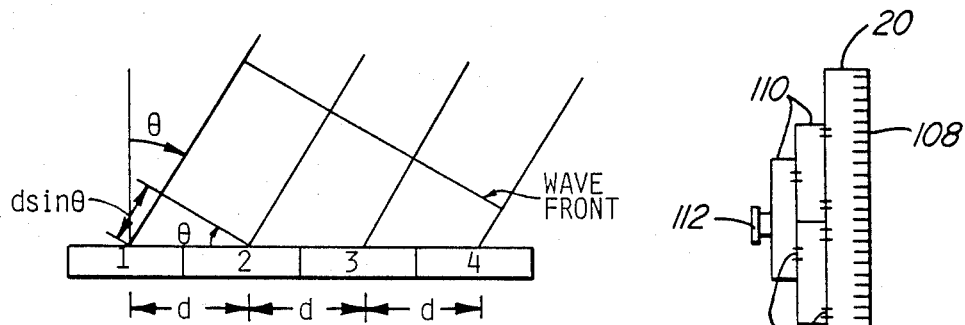
FIG. 17 is a diagrammatic view showing the relationship between a transmitted wave and a portion of the transmit feed array for the point-to-point system.

As previously discussed, an incremental phase shift is achieved between the signals that are coupled in the forty radial line summers 176. Hence, the beam-forming network 98 permits the antenna beams emanating from the transmit array 20 (FIGS. 1, 2, and 13) to be steered by frequency assignment. The incremental phase shift is related to the time delay between the waveguides 176 as well as frequency. Attention is now directed to FIG. 17 which is a diagrammatic view of four of the forty transmit array elements 106 (FIG. 13), showing the wavefront emanating therefrom, wherein "d" is equal to the spacing between transmit array elements 106. The resulting antenna beam has an angular tilt of θ, where θ is defined as the beam scan angle. This means the θ is the angle from normal of the transmit beam center. The incremental phase shift produced by the delay line arrangement is ΔΦ. The relationship between ΔΦ and θ is given by $$\Delta\Phi = \frac{2\pi d}{\lambda} \sin\theta$$

where:
λ = signal wavelength
θ = beam scan angle
d = spacing between array elements Hence, the east-west direction of the antenna beam is determined by the incremental phase shift which is different for the four delay lines 168-174 of the beam-forming network 98, resulting in the four transmit zones T1-T4 previously noted.

Having thus described the invention, it is recognized that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A device for interconnecting a first set of communications lines with a second set of communications lines wherein the first set of lines each carry a frequency division multiplexed signal having a plurality of channels, comprising:

interconnection means having a plurality of inputs respectively connected with said first set of lines for receiving the corresponding ones of said frequency division multiplexed signals and having a plurality of outputs respectively connected with said second set of lines for outputting to each of said second set of lines the signals on certain preselected channels of each of said frequency division multiplexed signals respectively received on said inputs, said interconnection means including a plurality of sets of filters respectively associated with said frequency division multiplexed signals and operative to pass only those signals in a corresponding channel, said intersection means further including a plurality of circulators respectively coupled between each of the filters in a set thereof and one of the corresponding inputs for distributing frequency division multiplexed signals to each of the filters in the corresponding set thereof.

2. A device for interconnecting a first set of communications lines with a second set of communications lines wherein the first set of lines each carry a frequency division multiplexed signal having a plurality of channels, comprising:

interconnection means having a plurality of inputs respectively connected with said first set of lines for receiving the corresponding ones of said frequency division multiplexed signals and having a plurality of outputs respectively connected with said second set of lines for outputting to each of said second set of lines the signal on certain preselected channels of each of said frequency division multiplexed signals respectively received on said inputs, said interconnection means including a plurality of sets of filters respectively associated with said frequency division multiplexed signals and operative to pass only those signals in a corresponding channel, each of said sets of filters including a plurality of groups thereof with each of said outputs being coupled with a group of filters in each of the sets thereof, one of the groups of filters in one set thereof being connected with one of the groups of filters in another set thereof, said groups of filters in the sets thereof being interconnected by ferrite circulators.

3. A device for routing the individual signals for any of a plurality of frequency division multiplexed signals each including a plurality of channels between a plurality of inputs and a plurality of outputs, comprising:

a plurality of inputs for respectively receiving said plurality of frequency division multiplexed signals;

a plurality of outputs, each of said outputs outputting only certain of the channels of each of said frequency division multiplexed signals received by said inputs such that said outputs collectively output all of the channels of all of said frequency division multiplexed signals; and, filter interconnection means connected between said inputs and said outputs for interconnecting each of said inputs with each of said outputs and for selectively filtering each of said frequency division multiplexed signals to separate the channels, said filter interconnection means including a plurality of sets of filters respectively associated with said plurality of frequency division multiplexed signals, said filters being respectively associated with the channels of the corresponding signal and each being operative to filter only the associated channel, each said of filters including at least certain filters respectively associated with corresponding ones of said outputs, each of certain filters in each set thereof having an input terminal coupled with one of said inputs and having an output terminal coupled with a respectively corresponding one of said inputs, such that the channels delivered to each of said outputs are defined by the outputs of said certain filters of all the sets thereof, said filter interconnection means including means coupled between said input and the input terminal of each corresponding set of filters for distributing the signals of each channel of each frequency division multiplexed signal to the corresponding filter of each set thereof such that each filter receives at the input terminal thereof a channel which is intended to filter, said distributing means including a plurality of interconnected ferrite circulators.

4. A device for routing the individual signals of any of a plurality of frequency division multiplex signals each including a plurality of channels between a plurality of inputs and a plurality of outputs, comprising:

a plurality of inputs for respectively receiving said plurality of frequency division multiplexed signals;

a plurality of outputs, each of said outputs outputting only certain of the channels of each of said frequency division multiplexed signals received by said inputs such that said outputs collectively output all the channels of all of said frequency division multiplexed signals; and, filter interconnection means connected between said inputs and said outputs for interconnecting each of said inputs with each of said outputs and for selectively filtering each of said frequency division multiplexed signals to separate the channels, said filter interconnection means including a plurality of sets of filters respectively associated with said plurality of frequency division multiplexed signals, said filters being respectively associated with the channels of the corresponding signal and each being operative to filter through only the associated channel, each set of said filters including at least certain filters respectively associated with corresponding ones of said outputs, each of said certain filters in each set thereof having an input terminal coupled with one of said inputs and having an output terminal coupled with a respectively corresponding one of said outputs, such that the channels delivered to each of said outputs are defined by the outputs of said certain filters of all the sets thereof, said filter interconnection means further including a plurality of interconnected ferrite circulators respectively coupled between the output terminals of the filters in each set thereof and the corresponding output.

5. The device of claim 4, wherein said circulators interconnect at least some of the output terminals of the filters of at least two sets thereof.

6. In combination with a satellite communications system of the type including earth orbiting satellite communicatively linking a plurality of earth terminals on an area of the earth for two-way communication, wherein said satellite receives a plurality of uplink beams respectively from different zones covering said area, said uplink beams carrying a plurality of respectively corresponding frequency division multiplexed receive signals over the same range of frequencies, each of said receive signals including a plurality of channels, and wherein said satellite transmits respectively to said zones a plurality of downlink beams carrying a plurality of respectively corresponding transmit signals over the same range of frequencies, a device for interconnecting said uplink and downlink beams at said satellite such that said receive signals are transformed into said transmit signals, comprising:

a plurality of inputs, one for each of said zones, for respectively receiving said plurality of receive signals;

a plurality of outputs, one for each of said zones, for respectively outputting said plurality of transmit signals; and, means connected between said inputs and said outputs for routing the signals on preselected ones of said channels of each of said receive signals from each of said inputs to each of said outputs such that the transmit signals output from each of said outputs comprise signals derived from the preselected channels of each of the receive signals, said routing means including a plurality of circulators respectively coupled between each of the filters in a set thereof and one of the corresponding inputs for distributing a receive signal to each of the filters in the corresponding set thereof.

7. For use in a satellite communications system of the type including an earth-orbiting satellite communicatively linking a plurality of earth terminals on an area of the earth, means for receiving a plurality of uplink beams respectively from different, essentially adjacent zones covering said area, wherein said uplink beams carry a plurality of respectively corresponding receive signals over the same set of frequencies, each of said receive signals including a plurality of channels respectively associated with regions within the corresponding zones, and means for transmitting respectively to said zones a plurality of downlink beams carrying a plurality of respectively corresponding transmit signals over the same range of frequencies, each of said transmit signals including a plurality of channels respectively associated with regions within the corresponding zones, a device for interconnecting said receive and transmit signals at said satellite in order to route said receive signals for destination to terminals within said area, comprising:

a plurality of inputs respectively associated with said zones for receiving said receive signals;

a plurality of outputs respectively associated with said zones for outputting said transmit signals; and, interconnection means coupled between said inputs and said outputs for routing signals on said inputs to said outputs in accordance with a preselected, fixed routing plan, said interconnection means including (1) a plurality of filtering means for selectively filtering each of said receive signals to separate said receive signals into channels, and (2) means for interconnecting said plurality of filtering means with said inputs and said outputs such that the transmit signals routed to adjacent regions in adjacent zones are carried over respective channels which are substantially spaced in frequency, whereby to substantially prevent terminals in said adjacent regions from receiving the same communication on the same channel, said plurality of filtering means including a plurality of sets of filters respectively associated with said channels and each being operative to filter only the associated channel, each set of said filters including at least certain filters respectively associated with corresponding ones of said outputs, each of said certain filters in each set thereof having an input terminal coupled with one of said inputs and having an output terminal coupled with a respectively corresponding one of said outputs, such that the channels delivered to each of said outputs are defined by the outputs of said certain filters in all of the sets thereof.

8. The device of claim 7, wherein each of said sets of filters includes two groups of said filters, the filters in one group of each set thereof being operative for filtering one alternate group of said channels, the filters in the other group of each set thereof being operative for filtering another alternate group of channels.

9. The device of claim 8, wherein said interconnection means further includes means for dividing the power of the signals received by each of said inputs into a first portion for delivery to one group of filters of each set thereof and a second portion for delivery to the other group of filters of each set thereof.

10. The device of claim 7, wherein said interconnection means includes means coupled between each input and the input terminal of each corresponding set of filters for distributing the signals of each channel of each frequency division multiplexed signal to the corresponding filter set thereof such that each filter receives at the input terminal thereof a channel which is intended to filter.

11. The device of claim 10, wherein said distributing means includes a plurality of circulators.

12. The device of claim 11, wherein at least certain of said circulators are interconnected and are formed of ferrite.

13. The device of claim 11, wherein said circulators interconnect at least some of the output terminals of the filters of at least two sets thereof.

14. The device of claim 7, wherein said means for interconnecting said plurality of filtering means is defined by fixed, hard-wired connections which provide permanent, fixed routing of the receive signals on said inputs to the transmit signals on said outputs.

15. For use in an earth-orbiting satellite communicatively linking a plurality of earth terminals on an area of the earth, of the type including means for receiving a plurality of uplink beams from different uplink zones in said area wherein said uplink beams respectively include a plurality of receive signals containing a plurality of channels respectively associated with regions in a corresponding one of said zones, and means for transmitting a plurality of downlink beams to said zones wherein said downlink beams respectively include a plurality of transmit signals containing channels respectively associated with regions in a corresponding one of said zones, a device for interconnecting said receive and transmit signals at said satellite in order to route said receive signals for destination to terminals within said area, comprising:

a plurality of inputs respectively associated with said zones for receiving said receive signals;

a plurality of outputs respectively associated with said zones for outputting said transmit signals; and, interconnection means coupled between said inputs and said outputs for routing signals on said inputs to said outputs in accordance with a preselected, fixed routing plan, said interconnection means including -

(1) a plurality of filtering means for selectively filtering each of said receive signals to separate said receive signals into channels, and, (2) means for interconnecting said plurality of filtering means with said inputs and said outputs such that the transmit signals are routed to the desired regions over the corresponding channels, said plurality of filtering means including a plurality of sets of filters respectively associated with said channels and each being operative to filter only the associated channel, each set of said filters including at least certain filters respectively associated with corresponding ones of said outputs, each of said certain filters in each set thereof having an input terminal coupled with one of said inputs and having an output terminal coupled with a respectively corresponding one of said outputs, such that the channels delivered to each of said outputs are defined by the outputs of said certain filters in all of the sets thereof.

16. The device of claim 15, wherein each of said sets of filters includes two groups of said filters, the filters in one group of each set thereof being operative for filtering one alternate group of said channels, the filters in the other group of each set thereof being operative for filtering another alternate group of channels.

17. The device of claim 16, wherein said interconnection means further includes means for dividing the power of the signals received by each of said inputs into a first portion for delivery to one group of filters of each set thereof and a second portion for delivery to the other group of filters of each set thereof.

18. The device of claim 15, wherein said interconnection means includes means coupled between each input and the input terminal of each corresponding set of filters for distributing the signals of each channel of each receive signal to the corresponding filter set thereof such that each filter receives at the input terminal thereof a channel which is intended to filter.

19. The device of claim 18, wherein said distributing means includes a plurality of circulators.

20. The device of claim 19, wherein at least certain of said circulators are interconnected and are formed of ferrite.

21. The device of claim 19, wherein said circulators interconnect at least some of the output terminals of the filters of at least two sets thereof.

* * * * *